United States Patent Office 2,808,428
Patented Oct. 1, 1957

2,808,428

PREPARATION OF MONOESTERS OF TEREPHTHALIC ACID

Bruce W. Hotten, Orinda, Calif., assignor to California Research Corporation, San Francisco, Calif., a corporation of Delaware No Drawing. Application June 28, 1954,
Serial No. 439,932

7 Claims. (Cl. 260—475)

This invention relates to an improved process for the preparation of monoesters of terephthalic acid, particularly the low molecular weight esters of terephthalic acid.

The preparation of low molecular weight monoesters of terephthalic acid has been fraught with difficulties. Attempts have been made to prepare the monoester of terephthalic acid by bringing together terephthalic acid and the desired alcohol in such mol ratios that the terephthalic acid was always present in a large excess. Although it was believed that primarily the monoester of terephthalic acid would be found in this reaction, which required the presence of an esterification catalyst, a series of compounds was formed. Only a small proportion of the reaction mixture consisted of the monoester, while the main proportion consisted of the diester. The separation of the individual components from the resulting mixture was difficult in view of the relative insolubilities of the components in numerous solvents, and the extremely high boiling points of these esters.

A further method which has been used in the preparation of the monoester terephthalic acid has included the process of preparing the monoester from the terephthalic acid at extremely high temperatures in the presence of a catalyst. However, in this reaction it is necessary to heat the terephthalic acid-alcohol mixture to such high temperatures as about 330° C., and such extreme pressures as about 400 p. s. i., and even as high as 1000 p. s. i. The necessity of using such high temperatures and high pressures increases the cost of the products considerably.

As used herein, the term "low molecular weight esters of terephthalic acid" means those esters having no more than 8 carbon atoms in an ester group. For example, the low molecular weight esters of terephthalic acid include the dioctyl ester of terephthalic acid, the dimethyl ester of terephthalic acid, and those esters which are intermediate and have no more than 8 carbon atoms in any one ester group.

Therefore, it is an object of the present invention to prepare monoesters of terephthalic acids by a process eliminating substantial losses of initial reactants, and avoiding the use of high temperatures and pressures.

According to the present invention, it has been discovered that a low molecular weight monoester of terephthalic acid can be prepared by reacting a low molecular weight diester of terephthalic acid with a base substance to form the relatively pure salt of the monoester of terephthalic acid free from undesirable reaction products such as the di-salts of terephthalic acids. The mono-salt is hydrolyzed to form the corresponding acid.

In accordance with this invention, a diester of terephthalic acid is dissolved in a non-aqueous organic solvent, and this solution of diesters is then reacted with a solution of a strongly basic reagent in a non-aqueous solvent to form the mono-salt of the monoester of terephthalic acid. The mono-salt of the monoester may then be hydrolyzed to yield the corresponding acid. It has been found that the mono-salt of the monoester of terephthalic acid precipitates from the non-aqueous organic solvent as soon as the mono-salt is formed. There is no ester radical interchange taking place between the mono-salt and the non-aqueous organic solvent which is used.

The solvents which are employed in the process set forth herein include organic solvents such as low molecular weight hydrocarbon compounds, aromatic compounds (preferably mononuclear aromatic hydrocarbon compounds), ketones, ethers and alcohols. Examples of solvents include pentane, hexane, heptane, nonane, hexene-1, heptene-1, octene-1, nonene-1, benzene, toluene, xylene, diisopropyl ether, dibutyl ether, 2-pentanone, 3-pentanone, 3-methyl butanone, 2-hexanone, methyl alcohol, ethyl alcohol, n-propyl alcohol, n-butyl alcohol, isobutyl alcohol, tertiary butyl alcohol, tertiary amyl alcohol, n-amyl alcohol, ethylene glycol, etc.

As used herein, the term "mononuclear aromatic hydrocarbons" means hydrocarbon compounds having a benzene nucleus, including, for example, benzene, and alkyl substituted benzene; for example, toluene, xylene, etc.

It is an essential feature of the process of the invention that the resulting products, that is, the salts of the monoesters of terephthalic acid, are substantially insoluble in the organic solvents used. Thus, as the salts are formed, they separate from the reaction mixture.

In the operation of the invention set forth herein, it is imperative that the reaction media (i. e., the organic solvents) be non-aqueous. As used herein, the term "non-aqueous" means that the solvents are substantially anhydrous; i. e., that, if unavoidable, a maximum of only about 1% of water be permitted in the non-aqueous organic solvents.

It is preferred to use benzene as the solvent for the diester terephthalate, and to use a low molecular weight alcohol as the solvent for the basic reagent.

The basic reagents which saponify one ester group of the diester to terephthalic acid are strong metal bases. That is, the basic reacting agents are alkaline oxides and hydroxides which substantially wholly dissociate in water. In particular, they are the oxides or hydroxides of the metals of Groups I and II of Mendeleeff's Periodic Table. The metals sodium, potassium, calcium, and barium are especially preferred.

The temperatures of the reaction are normally maintained at a minimum of 50° C.; however, it is preferred to use temperatures in the range of 60 to 80° C. The temperature is preferably maintained below the boiling or decomposition point of the monoester product, or of the terephthalic acid. Although the reaction takes place readily at atmospheric pressures, which pressures are preferred, pressures greater than atmospheric pressure may be used.

Furthermore, when only one solvent is used for both the diesterterephthalate and the basic substance, for purposes of convenience, the basic substance alone (not in solution) may be incorporated into the dialkylterephthalate solution directly.

The process itself may be performed either as a batch operation or as a continuous operation, including any such procedural details and modifications as are deemed expedient within the knowledge and skill of the art. As an embodiment of the invention, the diesters of the terephthalic acids are dispersed in the solvent (e. g., benzene) in a proportionate ratio of at least 1 part of solvent to 1 part of diester, and the diester-solvent mixture introduced into a heated reaction vessel. (It is preferred to use 4 parts of solvent for each part of the diester. However, the solvent-diester ratio may have a value as high as 10 or more.) A non-aqueous solution of the basic substance, preferably an alcohol solution (e. g., ethyl alcohol), is added to the reaction mixture and the whole mixture is heated at reflux temperatures until the reaction is substantially complete. As soon as the salt of the monoester is formed, it separates out from the reaction mixture as a separate solid phase. After the salt of the monoester has precipitated, it can then be recovered by filtration, or by decantation, after which the recovered mono-salt can be hydrolyzed to form the corresponding terephthalic acid.

The following examples are presented to illustrate the preparation of the monoester of terephthalic acid according to the present invention.

*Example 1.—Preparation of methyl hydrogen terephthalate*

A mixture of 45 pounds of dimethylterephthalate and 255 pounds of benzene was heated to 55° C. until all of the dimethylterephthalate was dissolved, after which a solution consisting of 12.3 pounds of potassium hydroxide and 58.5 pounds of absolute ethyl alcohol was added. The potassium methyl terephthalate precipitated out from the reaction mixture, which was heated at 55° C. for an additional 50 minutes.

Ten gallons of water was added to the above mixture to dissolve the potassium salt of monomethylterephthalate thus formed. The reaction mixture separated into two phases, and the aqueous layer of the salt was recovered. 3.5 liters of concentrated sulfuric acid was added to this aqueous layer at room temperature to form a free acid having the formula:

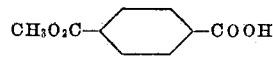

This monomethylterephthalic acid (methyl hydrogen terephthalate) separated as a precipitate, which was recovered by filtration, washed with water, and dried in vacuuo. After purification, the equivalent weight of the acid thus formed was 180, which is equal to the theoretical equivalent weight.

*Example 2.—Preparation of methyl potassium terephthalate*

A solution of 97 grams of dimethylterephthalate dissolved in 1300 ml. of absolute methyl alcohol was heated at reflux temperature. To this mixture was slowly added a solution prepared by dissolving 28 grams of potassium hydroxide in 275 ml. of methyl alcohol. The white crystals which separated out from this reaction mixture were recovered by filtration. After these crystals had been washed with hot benzene, and dried, fine white needle-like shaped crystals were obtained. The determined equivalent weight of the potassium salt thus formed was 218, which is equal to the theoretical value.

This application is a continuation-in-part of Hotten Serial No. 401,697, filed December 31, 1953 (now abandoned).

I claim:

1. A process for preparing monoesters of terephthalic acid comprising dissolving a diester of terephthalic acid in a solvent selected from the group consisting of aromatic solvents and alcohol solvents, said solvent being present in an amount at least equal to that of said diester, adding to said solution an alcohol solution of a basic substance selected from the group consisting of the metal oxides and hydroxides of Groups I and II of Mendeleeff's Periodic Table, heating the whole mixture to a minimum temperature of 50° C., followed by recovering the precipitated metal salt of monoester of terephthalic acid.

2. A process for preparing monoesters of terephthalic acid comprising forming a solution of diesters of terephthalic acids in an aromatic solvent, said solvent being present in an amount at least equal to that of said diester, adding to said solution an alcohol solution of a basic substance selected from the group consisting of the metal oxides and hydroxides of Groups I and II of Mendeleeff's Periodic Table, heating the whole mixture to a minimum temperature of 50° C., followed by recovering the precipitated metal salt of monoester of terephthalic acid.

3. A process for preparing monoesters of terephthalic acid comprising forming a solution of diesters of terephthalic acids in an aromatic hydrocarbon solvent, said solvent being present in an amount at least equal to that of said diester, adding to said solution an alcohol solution of a basic substance selected from the group consisting of the metal oxides and hydroxides of Groups I and II of Mendeleeff's Periodic Table, heating the whole mixture to a minimum temperature of 50° C., followed by recovering the precipitated metal salt of monoester of terephthalic acid.

4. A process for preparing the monomethyl ester of terephthalic acid comprising forming a solution of the dimethyl ester of terephthalic acid in an aromatic hydrocarbon solvent, said solvent being present in an amount at least equal to that of said dimethyl ester, adding to said solution an alcohol solution of a basic substance selected from the group consisting of the metal oxides and hydroxides of Groups I and II of Mendeleeff's Periodic Table, heating the whole mixture to a minimum temperature of 50° C., followed by recovering the precipitated metal salt of monomethyl ester of terephthalic acid.

5. A process for preparing monomethyl esters of terephthalic acid comprising forming a solution of a dimethyl ester of terephthalic acid in benzene, wherein the benzene is present in an amount at least equal to that of said dimethyl ester, adding to said solution an alcohol solution of potassium hydroxide, heating the whole mixture to a minimum temperature of 50° C., followed by recovering the precipitated potassium monomethyl terephthalate.

6. A process for preparing a monomethyl ester of terephthalic acid comprising forming a solution of one part of the dimethyl ester of terephthalic acid in from one to four parts of benzene, adding to said solution an alcohol solution of a basic substance selected from the group consisting of the metal oxides and hydroxides of Group I of Mendeleeff's Periodic Table, heating the whole mixture to a temperature from about 60° C. to about 80° C., followed by recovering the precipitated metal salt of monomethyl ester of terephthalic acid.

7. The process of claim 6 wherein said basic substance is potassium hydroxide.

References Cited in the file of this patent

UNITED STATES PATENTS 2,119,993     Kyrides _____ June 7, 1938
2,479,066     Gresham _____ Aug. 16, 1949

OTHER REFERENCES

Hammett: "Physical Organic Chemistry," McGraw-Hill, 1940, pp. 211–2.